United States Patent
Fritsch et al.

(10) Patent No.: US 9,611,763 B2
(45) Date of Patent: Apr. 4, 2017

(54) CONTROL VALVE FOR A HYDRAULIC APPARATUS WITH LOCKING FACILITY

(71) Applicant: Schaeffler Technologies AG & Co. KG, Herzogenaurach (DE)

(72) Inventors: Thomas Fritsch, Bamberg (DE); Josef Groschel, Gossweinstein (DE); Christoph Ross, Stegaurach (DE); Barbara Pluta, Eggolsheim (DE); Alexander Fichtner, Memmelsdorf (DE); Hubert Burkard, Hirschaid (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 43 days.

(21) Appl. No.: 14/442,184

(22) PCT Filed: Sep. 3, 2013

(86) PCT No.: PCT/DE2013/200153
§ 371 (c)(1),
(2) Date: May 12, 2015

(87) PCT Pub. No.: WO2014/075665
PCT Pub. Date: May 22, 2014

(65) Prior Publication Data
US 2016/0245129 A1    Aug. 25, 2016

(30) Foreign Application Priority Data
Nov. 13, 2012  (DE) .................. 10 2012 220 626

(51) Int. Cl.
*F01L 1/344* (2006.01)
*F01L 1/047* (2006.01)
*F16K 27/02* (2006.01)

(52) U.S. Cl.
CPC .............. *F01L 1/344* (2013.01); *F01L 1/047* (2013.01); *F01L 1/3442* (2013.01); *F16K 27/02* (2013.01); *F01L 2001/0475* (2013.01)

(58) Field of Classification Search
CPC ............ F01L 1/344; F01L 1/047; F16K 27/02
See application file for complete search history.

(56) References Cited

U.S. PATENT DOCUMENTS 4,557,288 A * 12/1985 Botnick ................ E03C 1/0401
                                                  137/315.13
5,170,841 A * 12/1992 Briet ........................ F16L 37/56
                                                     165/176

(Continued)

FOREIGN PATENT DOCUMENTS

DE    102008004591    7/2009
DE    102009039385    3/2011

(Continued)

*Primary Examiner* — Craig Schneider
*Assistant Examiner* — Kevin Barss
(74) *Attorney, Agent, or Firm* — Volpe and Koenig, P.C.

(57) ABSTRACT

A control valve for a hydraulic device, in particular a central valve of a camshaft adjuster for a reciprocating-piston internal combustion engine, having a holding component (1) in which a valve housing (3), a control sleeve (2) and a control piston (4) are arranged, wherein the control piston (4) is mounted so as to be loaded on one side by a spring and, on the other side, is mounted with limited axial displaceability in the control sleeve (2) by means of a locking ring (6), wherein the locking ring (6) can be fastened in the axial direction in an inner holder (14) on the holding component (1) and can be connected by a fixing device to a component of the control valve, and wherein the fixing device has fastening elements attached to the locking ring (6) and has matching recesses (10) in the valve housing (3) and/or in the control sleeve (2).

5 Claims, 5 Drawing Sheets

(56) References Cited

U.S. PATENT DOCUMENTS

| | | | |
|---|---|---|---|
| 8,739,749 B2 * | 6/2014 | Busse | F01L 1/3442 |
| | | | 123/90.15 |
| 8,910,603 B2 * | 12/2014 | Bayrakdar | F01L 1/3442 |
| | | | 123/90.17 |
| 2005/0252561 A1 | 11/2005 | Strauss et al. | |
| 2007/0095315 A1 | 5/2007 | Hoppe et al. | |
| 2007/0131281 A1 * | 6/2007 | Manger | F16K 24/04 |
| | | | 137/487.5 |
| 2010/0288384 A1 | 11/2010 | Hoppe et al. | |
| 2012/0152189 A1 | 6/2012 | Bayrakdar | |
| 2013/0118622 A1 | 5/2013 | Patzold et al. | |

FOREIGN PATENT DOCUMENTS

| | | |
|---|---|---|
| DE | 102010032251 | 1/2012 |
| EP | 1596041 | 11/2005 |

* cited by examiner

CONTROL VALVE FOR A HYDRAULIC APPARATUS WITH LOCKING FACILITY

FIELD OF THE INVENTION

The invention relates to a control valve for a hydraulic apparatus, in particular, a central valve of a camshaft adjuster for a reciprocating piston internal combustion engine, with a holding component in which a valve housing, a control sleeve, and a control piston are arranged, wherein the control piston is loaded on one side by a spring and is supported on the other side so that it can move in the control sleeve in an axially limited way by a locking ring, and wherein the locking ring can be fixed in the axial direction in an inner holder on the holding component and can be connected to a component of the control valve by a fixing device.

BACKGROUND

A corresponding control valve is known from DE 10 2009 039 385 A1. In this construction, the holding component is constructed as a camshaft end and the control housing is inserted there. The valve housing is supported in the interior of the camshaft on a shoulder and is fixed on the outer end by a spring ring that engages in an inner holder of the camshaft. The locking ring has, on its inner periphery, tabs that extend up to a shoulder on the control piston, so that this can be supported on the locking ring against the force of the spring. Furthermore, on the valve housing there are positive-locking elements that engage the locking ring from the inside, so that the control valve is constructed as an assembly and can be inserted, for installation or removal, into the holding component, in the present case, the camshaft. The inner tabs on the locking ring and the positive-locking elements on the valve housing hold the component together also against the force of the spring, so that it can be removed and installed again.

This desired measure is associated with large structural expense, because the positive-locking elements are expensive and complicated in production and assembly as individual parts or as parts formed on the valve housing. Because the locking ring must be greatly elongated to move it in and out of the positive-locking elements, there is the problem that it loses tension or breaks.

SUMMARY

The objective of the invention is to eliminate the disadvantages described above and to modify the control valve so that an assembly that can be installed and removed easily as one unit is provided with low structural complexity and is thus economical.

The objective of the invention is achieved in that the fixing device has fastening elements formed on the locking ring and matching recesses in the valve housing and/or in the control sleeve. Fastening elements on the securing ring can be molded very easily, so that the locking ring is hardly more expensive in production. Also recesses in the valve housing or in the control sleeve can be easily produced. The recesses in the control sleeve can be punched, because the control sleeve is advantageously made from steel. The recesses in the valve housing are also easily producible, because the valve housing is advantageously constructed as a plastic sleeve. The plastic sleeve can be fixed on the control sleeve, for example, by an injection molding process on the control sleeve.

In another construction of the invention it is provided that the fastening elements are formed as mounting brackets, oriented axially to the control valve, and have hooks oriented in the circumferential direction. The matching recesses are arranged in the valve housing and have undercuts allocated to the hooks, so that an axial fixing can be produced between the mounting brackets with hooks and the recesses with undercuts.

Advantageously, the recesses in the axial direction have cutouts extending up to the end of the valve housing, wherein these cutouts are inclined in the radial direction. In this way, the locking ring with the mounting brackets can be pushed at an angle through the cutouts until the hooks engage on the undercuts. By pivoting the mounting bracket including the locking ring, these are positioned and can be supported on tabs of the recesses that are arranged on the end of the cutouts.

In another construction of the invention it is provided that the fastening elements have radially outward directed lugs and that the adapted recesses are arranged in the control sleeve and constructed as openings or cutouts. The lugs are formed with an axial distance on the locking ring, so that the openings or cutouts have a sufficient distance to the edge of the control sleeve. The lugs extend so far inward that take over the axial limiting of the control piston, so that a locking ring with lugs does not need inward projecting tabs for limiting the control piston.

The radial length of the lugs extends so far outward or is designed so that the ends for installing the control valve are arranged inside the control sleeve and they extend, when locked, into the openings or recesses, wherein then the locking ring engages in the inner holder of the holding component. For removing the valve with the valve housing, control sleeve, and control piston, the locking ring is pressed out from the inner holder of the holding component, wherein then the lugs remain in the openings so far that a fixing of the entire assembly is given.

BRIEF DESCRIPTION OF THE DRAWINGS

For further explanation of the invention, reference is made to the drawings in which embodiments of the invention are shown simplified.

Shown are.

DETAILED DESCRIPTION OF THE PREFERRED EMBODIMENTS

Figure 1:
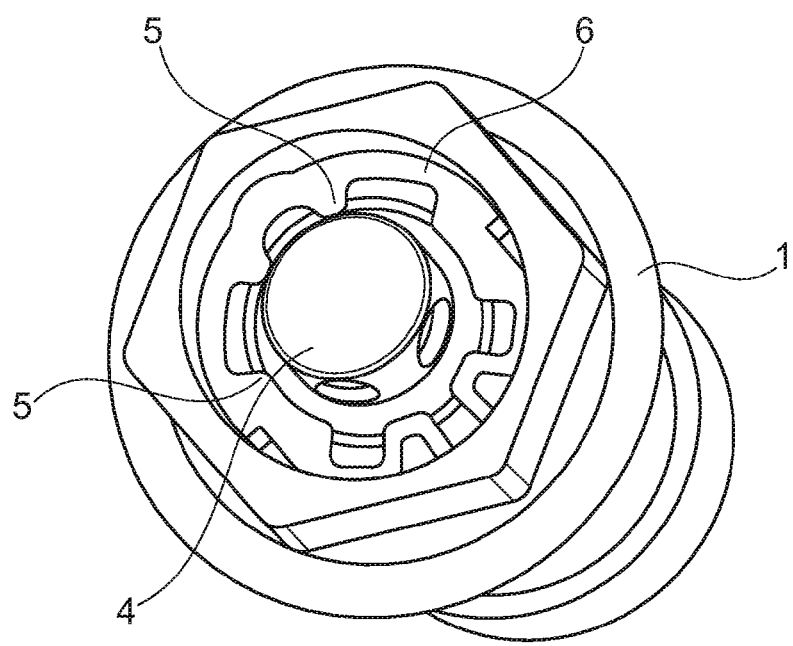
FIG. 1: a perspective view of a control valve with holding component.

In FIGS. 1 to 7, as far as shown in detail, 1 designates a holding component that is constructed in FIG. 1 as a central screw that is screwed into a camshaft. The holding component 1 according to FIGS. 5 to 7 can be constructed as any other component, e.g., the end of a hollow camshaft. In the holding component 1 there is a structural unit of a control valve fixed as an assembly. This comprises a control sleeve 2 that is surrounded by a valve housing 3 that is constructed as a plastic sleeve and is advantageously mounted on the control sleeve 2. In the control sleeve 2, a control piston designated with 4 is housed that is guided so that it can move axially and is loaded by a not-shown spring. The control piston 4 is axially limited by tabs 5 on the inner periphery of a locking ring designated with 6 (FIGS. 1, 2, and 4) or by lugs 7 on the locking ring 6 according to FIGS. 5 to 7.

In the embodiment according to FIGS. 1 to 4, mounting brackets 8 that have radially projecting hooks 9 on their ends are formed on the locking ring 6. In the valve housing 3 there are recesses 10 that have undercuts 11 and cutouts 12.

Figure 2:
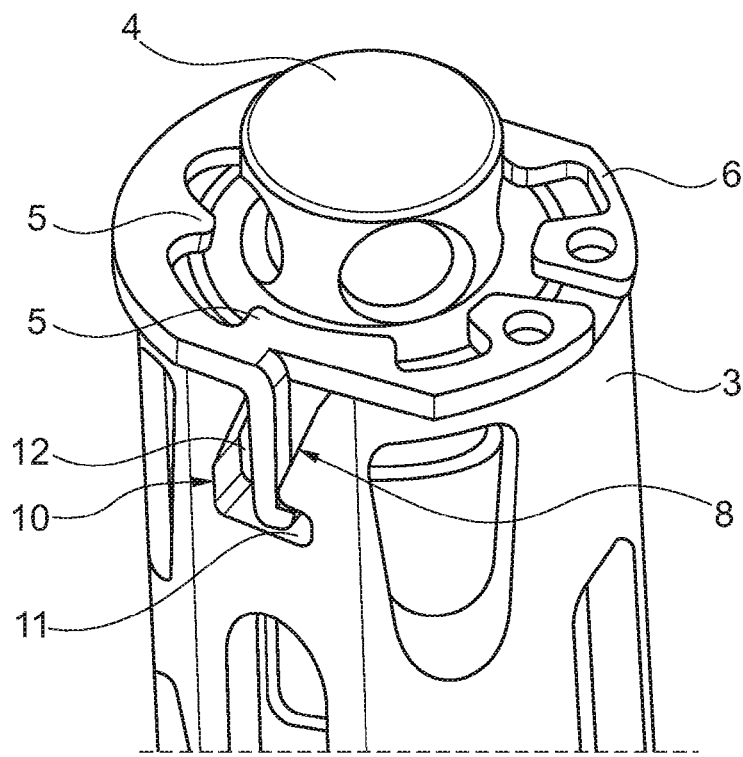
FIG. 2: a perspective view of an assembly of the control valve with control piston, control sleeve, and valve housing and hooked mounting brackets.
Figure 3:
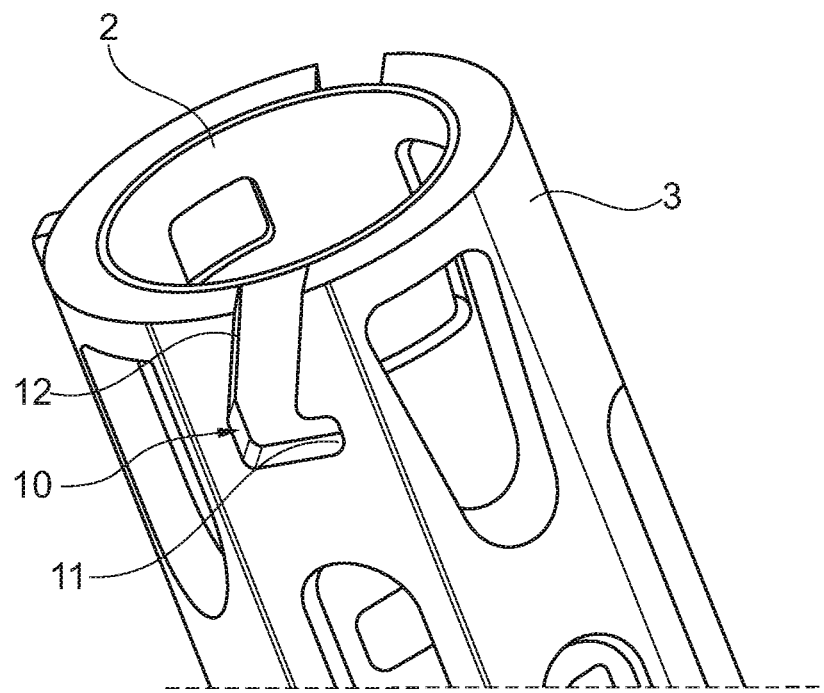
FIG. 3: a perspective view of a valve housing with a control sleeve.
Figure 4:
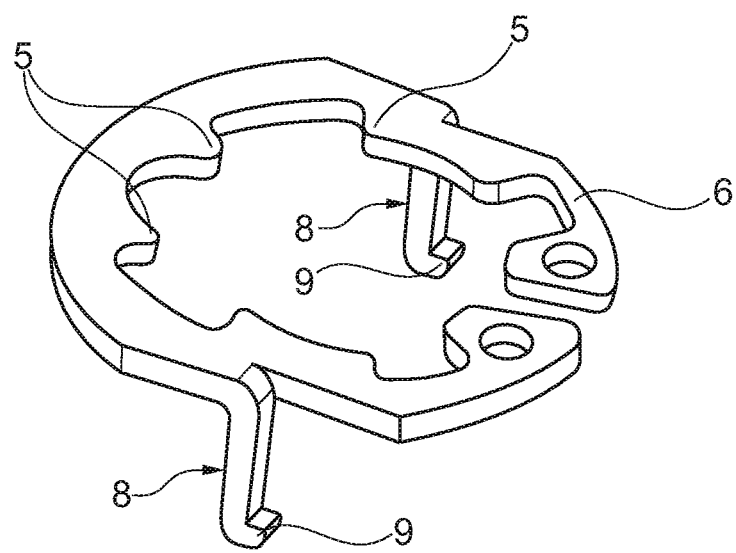
FIG. 4: a perspective view of a spring ring.

As can be easily seen in FIGS. 2 to 4, for fixing, the locking ring 6 including the mounting brackets 8 are tilted so that the mounting brackets 8 with the hooks 9 can be inserted through the cutouts from the outside until the hooks 9 are supported on the undercuts 11. Then the locking ring 6 is pivoted with mounting brackets 8, so that the mounting brackets 8, as shown in FIG. 2, can be supported on the outer edge of the cutouts 12 and are have an axis-parallel orientation.

Figure 5:
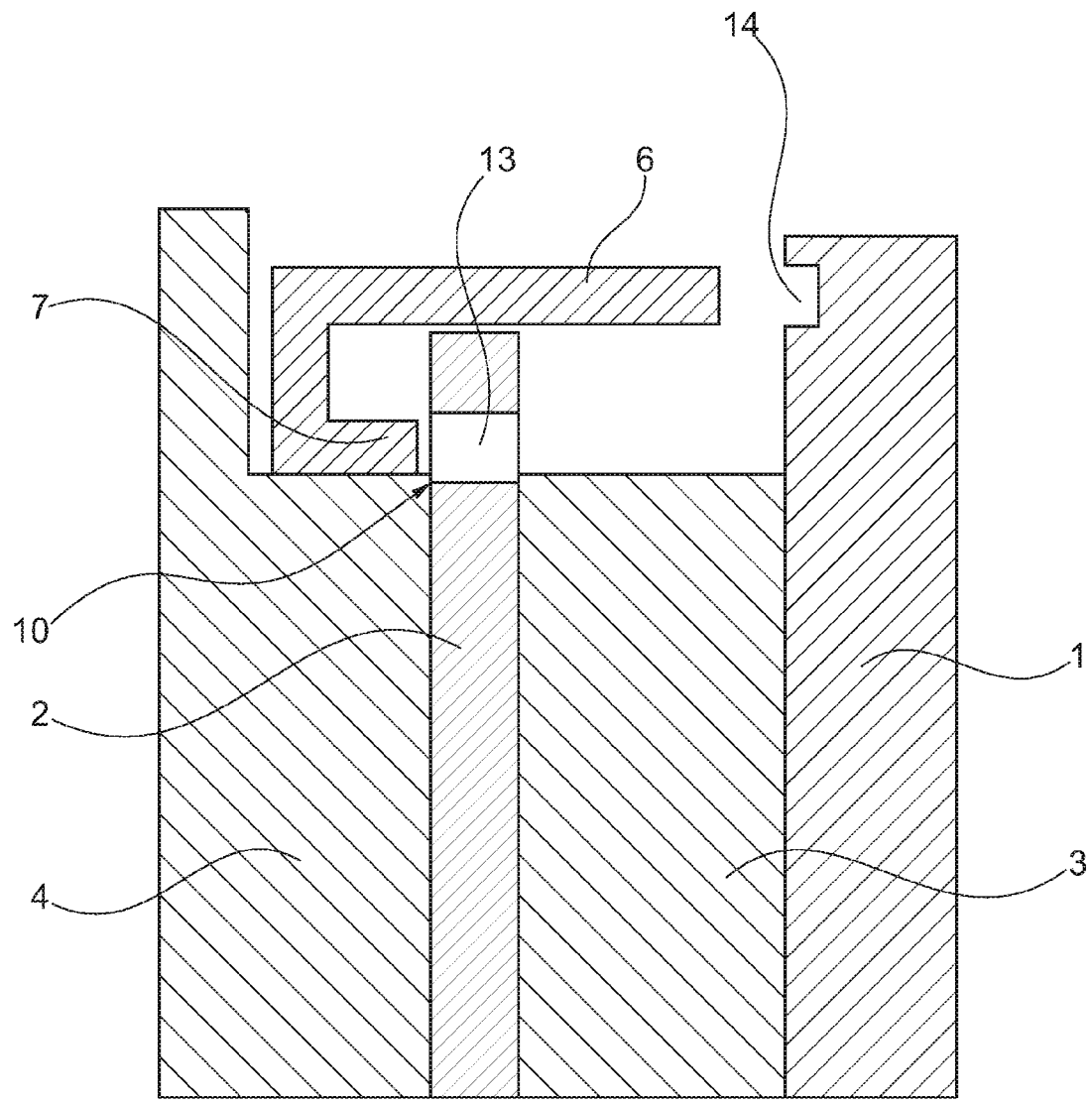
FIG. 5: a partial section through a control piston, a control sleeve, a valve housing, and a holding component at an enlarged scale with lugs on the locking ring in the assembled position.
Figure 6:
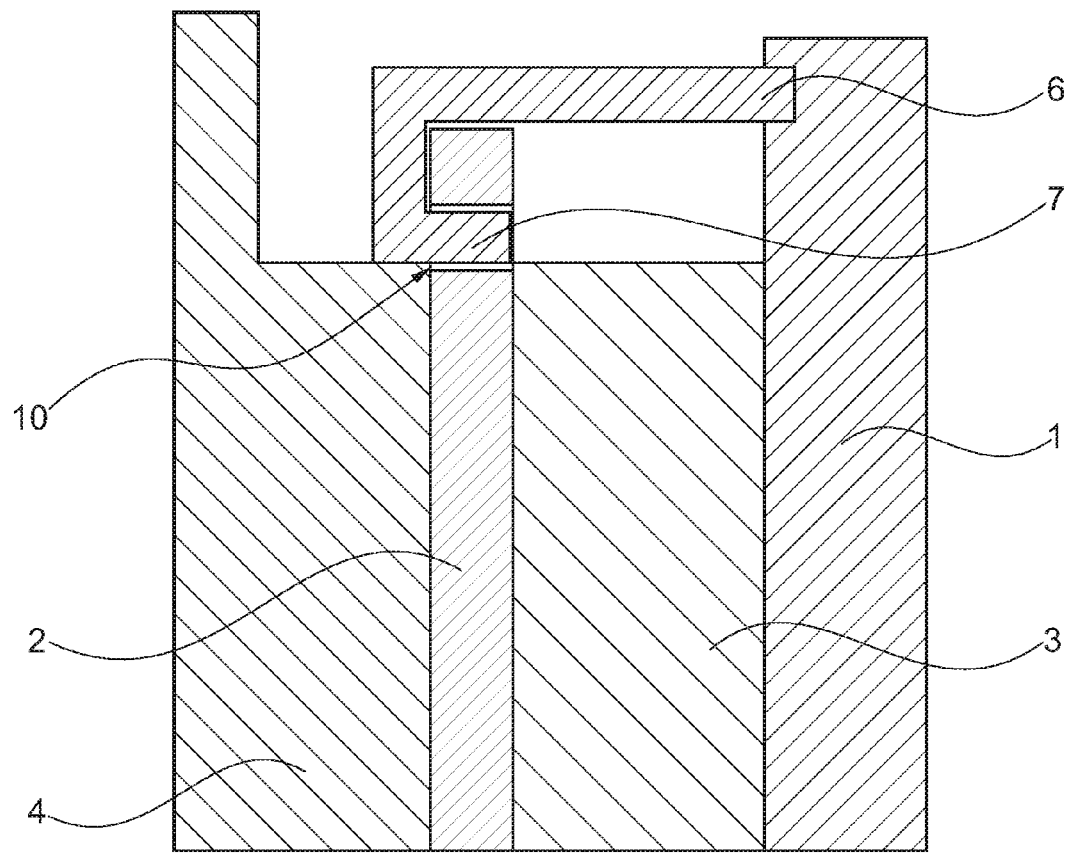
FIG. 6: a section corresponding to FIG. 5 with locking of the control valve in the holding component.
Figure 7:
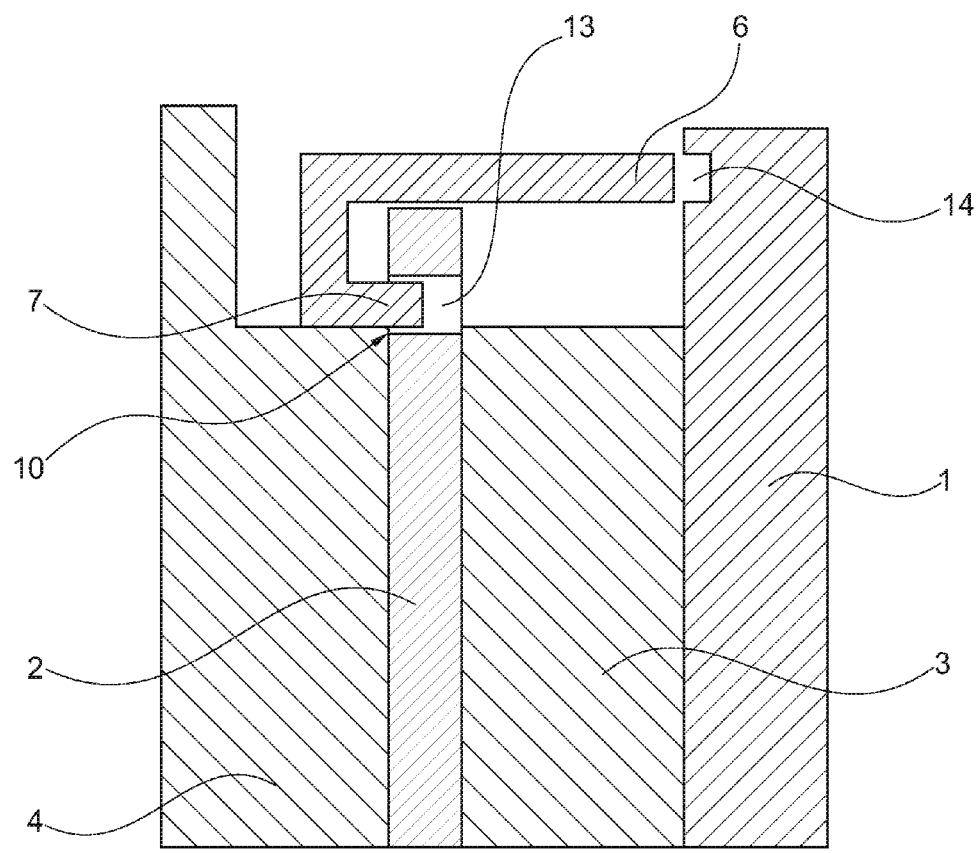
FIG. 7: a section corresponding to FIG. 5 with fixed control valve but loosened locking ring in the holding component.

In the embodiment according to FIGS. 5 to 7, lugs 7 that are at a distance axially from the locking ring 6 are formed on the locking ring 6. As can be further seen in FIGS. 5 to 7, the lugs 7 form the axial limit of the control piston 4, so that the tabs 5 on the locking ring according to FIGS. 1, 2, and 4 can be eliminated. The lugs 7 correspond to the openings 13 in the control sleeve 2.

During the assembly according to FIG. 5, the locking ring is compressed so far that the ends of the lugs 7 are arranged within the control sleeve, so that the components can be joined together. Then the locking ring 6 is unloaded, so that the lugs 7 project into the openings 13 and the locking ring 6 engages in the inner holder 14 on the holding component 1.

For removal, as shown in FIG. 7, the locking ring 6 is compressed only so far until it projects out of the inner holder 14 on the holding component 1, wherein the lugs 7 are still arranged sufficiently in the openings 13 and the assembly of the control valve, consisting of the control piston, control sleeve, not-shown spring, and valve housing including the locking ring, can be pulled out from the holding component 1.

LIST OF REFERENCE NUMBERS

1 Holding component
2 Control sleeve
3 Valve housing
4 Control piston
5 Tabs
6 Locking rings
7 Lugs
8 Mounting bracket
9 Hook
10 Recesses
11 Undercuts
12 Cutouts
13 Openings
14 Inner holder

The invention claimed is:

1. A control valve for a hydraulic device, comprising a holding component, and a valve housing, a control sleeve, and a control piston arranged in the holding component, the control piston is biased on one side and is supported on an other side for movement in the control sleeve in an axially limited way by a locking ring, and the locking ring is fixable in an axial direction and is connectable to a component of the control valve by fastening elements formed on the locking ring and matching recesses formed in the valve housing, the fastening elements are constructed as mounting brackets and are oriented axially to the control valve and include hooks, the matching recesses have undercuts allocated to the hooks, and the matching recesses have cutouts extending in the axial direction up to an end of the valve housing.

2. The control valve according to claim 1, wherein the cutouts are constructed at an angle in a radial direction.

3. A control valve for a hydraulic device, comprising a holding component, and a valve housing, a control sleeve, and a control piston arranged in the holding component, the control piston is biased on one side and is supported on an other side for movement in the control sleeve in an axially limited way by a locking ring, and the locking ring is fixable in an axial direction and is connectable to a component of the control valve by fastening elements formed on the locking ring and matching recesses formed in the control sleeve, wherein the fastening elements are constructed as lugs oriented radially outward, and the matching recesses are constructed as openings.

4. The control valve according to claim 3, wherein the lugs provide an axial limiting of the control piston.

5. The control valve according to claim 3, wherein the lugs extend radially outward so far that they remain in the openings when the locking ring is pushed out of an inner holder of the holding component.

* * * * *